No. 668,036. Patented Feb. 12, 1901.
A. C. CORNELL.
FOOD HEATING AND SERVING APPARATUS.
(Application filed Nov. 2, 1900.)
(No Model.) 2 Sheets—Sheet 2.
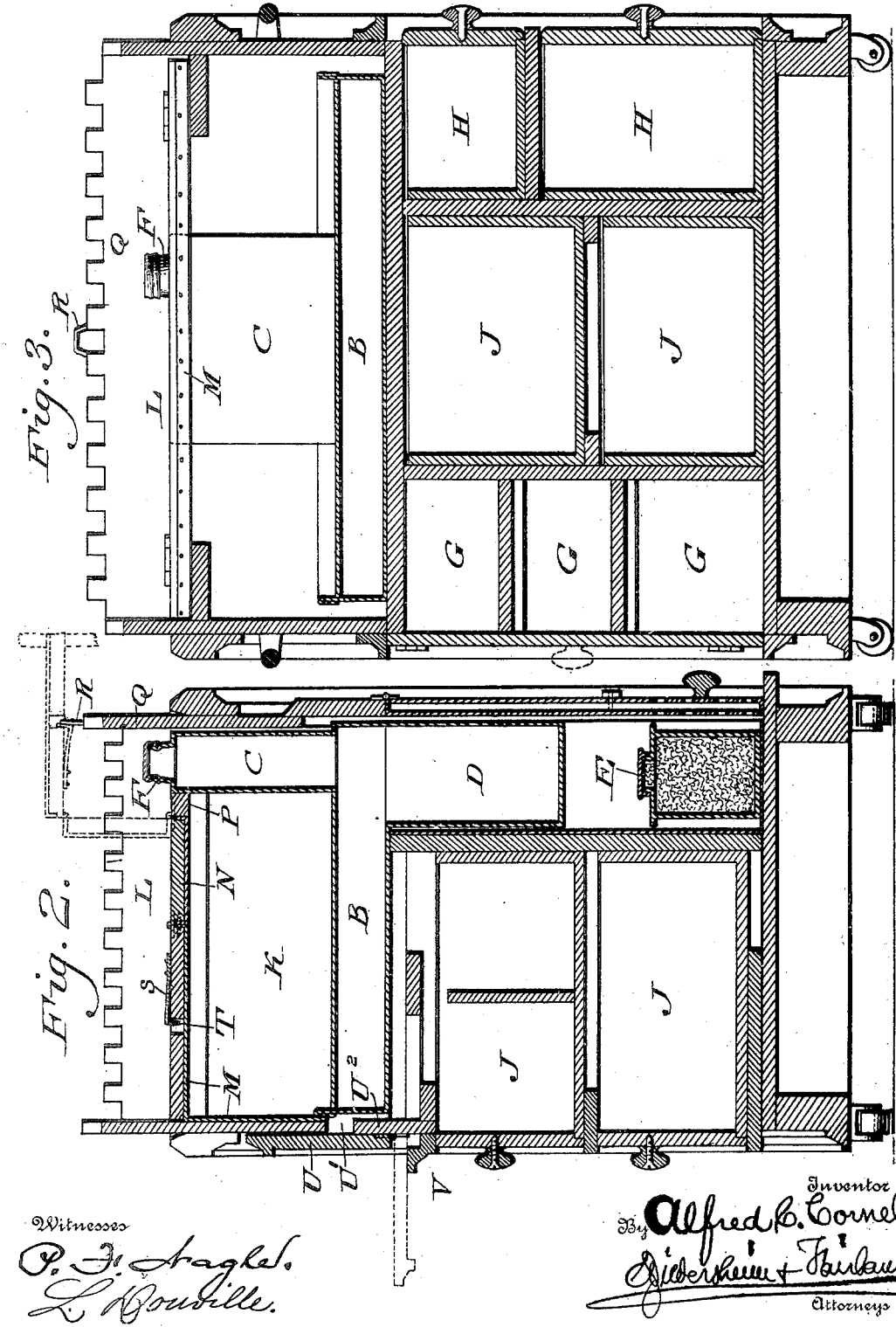

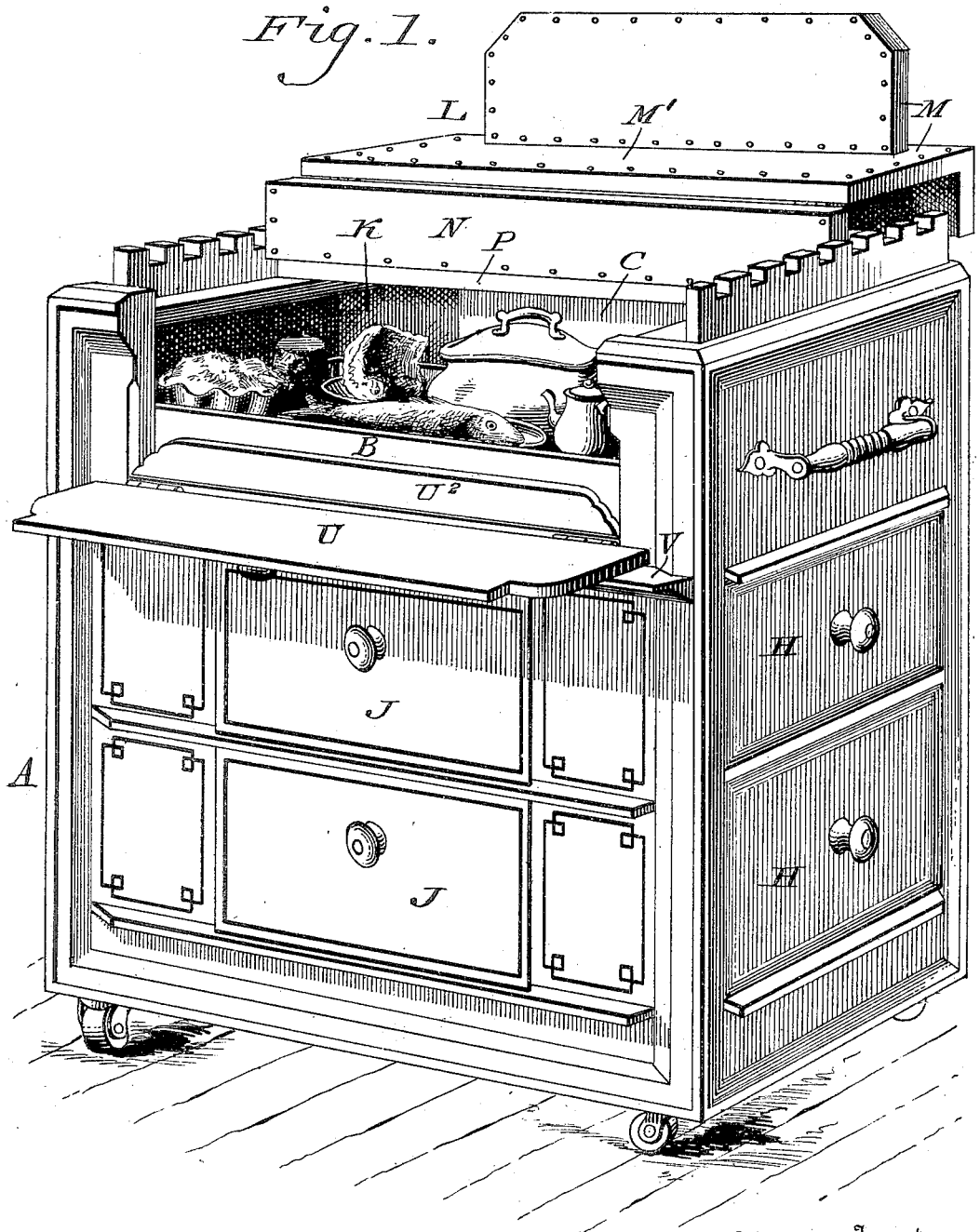

UNITED STATES PATENT OFFICE.

ALFRED C. CORNELL, OF PHILADELPHIA, PENNSYLVANIA.

FOOD HEATING AND SERVING APPARATUS.

SPECIFICATION forming part of Letters Patent No. 668,036, dated February 12, 1901.

Application filed November 2, 1900. Serial No. 35,213. (No model.)

*To all whom it may concern:*

Be it known that I, ALFRED C. CORNELL, a citizen of the United States, residing in the city and county of Philadelphia, State of Pennsylvania, have invented a new and useful Improvement in Food Heating and Serving Cabinets, of which the following is a specification.

My invention consists of a food heating and serving cabinet, more particularly for catering purposes, in which dishes and articles of food may be conveyed in a warm condition to and retained as such at the place where it is required. Shelves or tables are also provided, on which plates, &c., may be placed to receive the different courses, the device being also furnished with drawers for tableware, linen, &c., and a cupboard for carrying food—such as oysters, clams, and the like—the construction of parts being hereinafter described and the novel features pointed out in the claims that follow the same.

Figure 1 represents a perspective view of a food heating and serving cabinet embodying my invention. Figs. 2 and 3 represent vertical sections thereof at a right angle to each other.

Similar letters of reference indicate corresponding parts in the figures.

Referring to the drawings, A designates a casing, in the upper portion of which is supported the hollow tray B, which is provided with the elevated supply-chamber C and the depending heating-chamber D.

Supported in the lower portion of the casing below the heating-chamber D is the lamp E. The supply-chamber C is provided with the inlet-nozzle F and a cap thereon for closing purposes.

In one side of the casing A is the cupboard G, and in the other side are the drawers H. In front are the drawers J, the same being designed for the reception of tableware, linen, napkins, &c., while the cupboard G is adapted to receive plates on which oysters, clams, or other food may be placed.

The upper part of the casing A constitutes the chamber K, in which the tray B is placed, it being seen that dishes and articles of food are placed in said chamber on said tray as a warming medium therefor.

In order to cover and inclose the chamber K, I employ the lid L, which is formed of the angular member M and the members N and P, the member P being stationary and the members M and N hinged to each other and to said stationary member, the inner faces of said members M and N being lined with metal, so as to assist in retaining the heat in the chamber K and become warmed of themselves for subsequent use.

Q designates a vertical rim or border at the back of the top of the casing, and R designates a finger rising therefrom, the same being adapted to engage a spring-catch S, which is secured to the upper side of the member M of the lid, said member having a recess T, which permits said finger R to enter said recess and engage the nose of said catch when the lid is in open condition, thus preventing movement of the lid.

At the front of the casing A is the shelf U, which is hinged to said casing and when in inoperative position closes against the front limb of the member M of the lid and when in operative position is thrown down to a horizontal position and supported on the ledge V, which is connected with the casing A below said shelf.

The operation is as follows: Water is supplied to the tray B and chamber D through the chamber C, and the lamp is lighted, thus heating said tray, and consequently the chamber K, it being noticed that the bottom of the latter and the back thereof are heated by said tray B and the supply-chamber C. Articles of food are now placed on said tray and the chamber K is closed, and the device may be carried to the place of service. In closing the chamber K the lid L is restored to its normal position, as shown in Fig. 2, and the shelf U placed in upright position against the vertical limb of the angular member of the lid, as also shown in said Fig. 2. Should there be an excess of heat, the shelf U may be lowered, thus uncovering the space $U'$ below said vertical limb and the vertical piece $U^2$ of the frame of the casing A, to which said shelf is hinged, said space $U'$ providing an outlet for the heat, steam of the food, &c., and also serving as a ventilator for the chamber K. When the food is required, the lid is opened and its members placed in the position shown in Fig. 1, as is also the shelf U, if not previously lowered, it being noticed that the inner face of the horizontal limb of the member M of the lid also constitutes a shelf, as at M'. Plates may now be placed on the shelves U M' and the food carved and served. In the intervals of the courses the lid will be closed, thus retaining the heat in the chamber K, the effect of which on the food therein is evident. When the service is ended, the lamp may be extinguished and the soiled dishes and articles of tableware, napkins, &c., placed some in the different drawers and cupboard and others in the chamber K, after which the device may be carried from the place elsewhere, as the caterer may elect.

As the supply-chamber C rises from the tray B it forms the back of the chamber K, and thus provides an increased heating-surface for said chamber K, said tray constituting the base or floor of the heating-chamber and serving to support the articles of food, plates, &c., placed thereon, as has been stated.

Having thus described my invention, what I claim as new, and desire to secure by Letters Patent, is—

1. A casing, a storage-chamber therein, a hollow tray in said chamber forming the bottom thereof, a supply-chamber rising from said tray at the back of said tray, an auxiliary chamber depending from said tray, and a heater for said depending chamber.

2. A casing, a chamber therein and means for heating the same, and a lid for said chamber formed of sections hinged to each other, and a member on one of said sections extending at an angle thereto, whereby the section with said member thereon constitutes a shelf in the open condition of the casing.

3. A casing, a chamber therein, and means for heating said chamber, in combination with a lid which may be folded over said chamber, a catch on said lid, and an engaging device on said casing for said catch, said lid having a recess therein adapted to receive said engaging device while in contact with said catch.

4. A casing having a storage-chamber therein, a hollow tray forming the floor of said chamber, a lid with a depending member in front of said chamber, a vertical piece on the frame in front of said tray, a heat-escaping space existing between said lid and said piece, and an auxiliary shelf in front of said chamber, said shelf being adapted to be placed in vertical position closing said space and also in horizontal position for purpose of service.

ALFRED C. CORNELL.

Witnesses;
JOHN A. WIEDERSHEIM,
C. D. McVAY.